United States Patent
Ji et al.

(10) Patent No.: US 8,627,442 B2
(45) Date of Patent: Jan. 7, 2014

(54) HIERARCHICAL RULE DEVELOPMENT AND BINDING FOR WEB APPLICATION SERVER FIREWALL

(75) Inventors: Peng Ji, Beijing (CN); Lin Luo, Beijing (CN); Vugranam C. Sreedhar, Yorktown Heights, NY (US); Shun Xiang Yang, Beijing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 13/114,315

(22) Filed: May 24, 2011

(65) Prior Publication Data
US 2012/0304275 A1 Nov. 29, 2012

(51) Int. Cl.
G06F 9/00 (2006.01)
G06F 15/16 (2006.01)
G06F 17/00 (2006.01)
G06F 11/00 (2006.01)
G06F 12/14 (2006.01)
G06F 12/16 (2006.01)
G08B 23/00 (2006.01)

(52) U.S. Cl.
USPC ............................................. 726/11; 726/23

(58) Field of Classification Search
USPC ......................................................... 726/11
See application file for complete search history.

(56) References Cited

U.S. PATENT DOCUMENTS

| 7,318,237 | B2 | 1/2008 | Moriconi et al. | |
| 7,472,413 | B1 * | 12/2008 | Mowshowitz | 726/10 |
| 7,552,471 | B2 * | 6/2009 | Roddy et al. | 726/11 |
| 7,698,398 | B1 | 4/2010 | Lai | |
| 7,757,287 | B2 * | 7/2010 | Gassoway | 726/24 |
| 7,761,638 | B2 | 7/2010 | Post | |
| 7,818,788 | B2 | 10/2010 | Meier | |
| 7,831,693 | B2 | 11/2010 | Lai | |
| 7,895,651 | B2 | 2/2011 | Brennan | |
| 8,024,804 | B2 * | 9/2011 | Shulman et al. | 726/23 |
| 2003/0065942 | A1 * | 4/2003 | Lineman et al. | 713/201 |
| 2004/0073811 | A1 * | 4/2004 | Sanin | 713/201 |

(Continued)

OTHER PUBLICATIONS

Hossain, MS.-et al.; "AEGIS: A lightweight Firewall for Wireless Sensor Networks"; 6th IEEE Interna'l Conferencee(DCOSS 2010); Springer; pp. 258-272; 2010.

(Continued)

*Primary Examiner* — Nathan Flynn
*Assistant Examiner* — Jason C Chiang
(74) *Attorney, Agent, or Firm* — Anne V. Dougherty; Otterstedt, Ellenbogen & Kammer, LLP

(57) ABSTRACT

At least one of an HTTP request message and an HTTP response message is intercepted. A corresponding HTTP message model is identified. The HTTP message model includes a plurality of message model sections. Additional steps include parsing a representation of the at least one of an HTTP request message and an HTTP response message into message sections in accordance with the message model sections of the HTTP message model; and binding a plurality of security rules to the message model sections. The plurality of security rules each specify at least one action to be taken in response to a given condition. The given condition is based, at least in part, on a corresponding given one of the message sections. A further step includes processing the at least one of an HTTP request message and an HTTP response message in accordance with the plurality of security rules. Techniques for developing rules for a web application server firewall are also provided.

13 Claims, 18 Drawing Sheets

(56) References Cited

U.S. PATENT DOCUMENTS

| | | | |
|---|---|---|---|
| 2004/0215630 A1* | 10/2004 | Parekh et al. | 707/100 |
| 2007/0022119 A1 | 1/2007 | Roy et al. | |
| 2007/0266149 A1* | 11/2007 | Cobb et al. | 709/224 |
| 2008/0163373 A1 | 7/2008 | Maynard | |
| 2008/0229381 A1* | 9/2008 | Sikka et al. | 726/1 |
| 2009/0038015 A1 | 2/2009 | Diamant | |
| 2009/0187964 A1 | 7/2009 | Kao et al. | |
| 2009/0205047 A1 | 8/2009 | Podjarny | |
| 2009/0271863 A1 | 10/2009 | Govindavajhala | |
| 2009/0327411 A1 | 12/2009 | Dang | |
| 2010/0017868 A1* | 1/2010 | Hao et al. | 726/11 |
| 2010/0070447 A1 | 3/2010 | Pfuntner | |
| 2010/0169974 A1 | 7/2010 | Calendino | |
| 2010/0242114 A1 | 9/2010 | Bunker | |
| 2011/0283359 A1* | 11/2011 | Prince et al. | 726/23 |
| 2011/0321151 A1* | 12/2011 | Gluck | 726/11 |
| 2012/0096536 A1* | 4/2012 | Dewey et al. | 726/11 |
| 2012/0117649 A1* | 5/2012 | Holloway et al. | 726/24 |
| 2013/0019314 A1 | 1/2013 | Ji | |

OTHER PUBLICATIONS

Henrique, WG.-et al.; "Web Application Firewalls: What the vendors do Not want you to know"; The OWASP Foundation—http://www.owasp.org: AppSec EU09 Poland; 2009.

Tech Republic; "Vulnerability Assessment Plus Web Application Firewall (VA+WAF)"; F5 Networks & WhiteHat Security; Jun. 2008.

Qualys & Imperva; "Unified Web Application Vulnerability Assessment and Virtual Patching with Qualys and Imperva"; Imperva WAF's Virtual Patching; Mar. 2010.

Faust. J.-et al.; "Reducing Organizational Risk Through Virtual Patching"; 2011 SANS Institute InfoSec Reading Room; Jun. 19, 2010.

Vries, S. de , "A Corsaire White Paper: A Modular Approach to Data Validation in Web Applications". Corsaire, Jan. 2006.

Mell, P. -et al. "The NIST Definition of Cloud Computing". NIST, Version 15, Oct. 7, 2009.

Huang et a.; "Autonomous Hot Patching for Web-Based Applications", COMPSAC 29th Annual International, Jul. 26-28, 2005, vol. 2, pp. 51-57.

Siemens AG et al.; "Automated Patching/Update of Network Management Systems/Network Elements/Applications", IPCOM000170268D, Jun. 3, 2008.

Schryen, G. ; "A Comprehensive and Comparative Analysis of the Patching behavior of Open Source and . . . Vendors", IMF Fifth Inter. Conf. on, Sep. 15-17, 2009, p. 153-168.

IBM et al.; "System, Method and Apparatus for Fixing Security Vulnerabilities in Web Services Automatically", IPCOM000200264D, Oct. 3, 2010.

Modsecurity, Modsecurity: Open Source Web Application Firewall, pp. 1-2, dowloaded from www.modsecurity.org Apr. 18, 2011.

IBM, "web.xml file," downloaded from publib.boulder.ibm.com on Apr. 22, 2011, pp. 1-5.

Raja, "Struts.xml Configuration File," downloaded from www.javabeat.net on Apr. 22, 2011, pp. 1-4.

* cited by examiner

FIG. 5

```
POST http://chinabank.com:8080/Account/transferMoney.php
    HTTP/1.0
Accept: image/gif, image/x-xbitmap, image/jpeg
Referer: http://9.186.54.51:8080/MyBankApp/request.jsp
Accept-Language: zh-cn, en-us; q=0.5
Content-Type: application/x-www-form-urlencoded
Proxy-Connection: Keep-Alive
User-Agent : Mozilla/4.0 (compatible; MSIE 6.0;
    Windows NT 5.1; SV1; .NET CLR 2.0.50727;
        .NET CLR 3.0.04506.648; .NET CLR 3.5.21022; CIBA)
Host: 9.186.54.51:8080
Content-length: 19
Pragma: no-cache
Cookie: JSESSIONID=29D07EE24B69CC4C4173F9AFBF87A6A acct=BOB&amount=100
```

*FIG. 7*

```
"requestmessage" :[
{ "_id_" : "M01",
"method": {"content": "POST"},
"version": {"content": " "},
   "urltemplate": {"content":"http://chinabank.com:8080
                   /Account/transferMoney.php",
      "hostname": {"_id_": "H01",
                   "content": "chinabank.com",
                   "filepathnode": [{"_id_": "FPN01",
                       "resource": "Account",
                       "filepathnode": {["_id_": "FPN02",
                          "resource":"transferMoney.php",
                       }]
                   }]
   }]
}
      },
"header": { "content": " ",
         "parameter": [ {"name":"Accept"},
                        {"name":  "Referer"},
                        {"name":  "Accept-Language"},
                        {"name":  "Content-Type"},
                        {"name":  "Proxy-Connection"},
                        {"name":  "User-Agent"},
                        {"name":  "Host"},
                        {"name":  "Content-length"},
                        {"name":  "Pargma"} ],
   "cookie":   {"content": " ",
               "parameter": [{"name": "JSESSIONID"}],
         }
      },
"body": { "content": " ",
         "parameter": [ {"name": "acct"},
                        {"name": "amount"}, ],
         }
   },
]
```

FIG. 8

| | | | | |
|---|---|---|---|---|
| Rule Binding | Rule Definition | Appscan Report Analysis | Rule Transformation | Monitoring | System Config |

Rule
New + Update & Delete ✗

| No. | RuleName | Description | Condition | Action |
|---|---|---|---|---|
| 1 | PHONELIKE | The input for the filed is number. | SIG.MATCH("[0-9]+$","ARG_INPUT") | ALLOW LOG |
| 2 | CHECKCSRF | Check the embedded CSRF token. | BOOL.NOT(STR.EQ (ARG_INPUT.COOKIE.PARAMETER..I3sessionid)) | LOG BLOCK |
| 3 | HASCSRFTOK | Check if CSRFToken exists. | STR.EQ(_NULL_BODY PARAMETER CSRFToken) | LOG EXECUTE |
| 4 | SQL-I | The input contains SQL injection attack strings. | SIG.MATCH"\b(?:s(?:chemananme\|ys (?:cat\|item_user\|ibmsys)\w{1,10})\|elect{1,100}\b(?:(?:char\|ascii\|int)\s*\\|(?:top)\|(?:count\|length))\s*\(.{1,100}\)from\|from\b.{1,100}(?:where\|.*fetch first)\)\|current_server)\|(?:alter\|drop\|create)\s*(?:database\|function\|proc\|table\|trigger\|view\|user\|schem\|truncate)\s*table\|group's*by, *having\|in\sert\|sinto\|update | LOG BLOCK |
| 5 | INSERTCSRFT | | | |
| 6 | EMAIL | | | |
| 7 | STRINGEQ | | | |
| 8 | STRINGNOSPA | | | |
| 9 | SAFETEXT | | | |
| 10 | URL | | | |
| 11 | XSS | | | |

RuleDetail
Save □ Back ⇦

RuleName: WASPPattern_URL
Description: Checking URL pattern
ConditionDescription: URL pattern condition
ConditionOperator: SIG.NONMATCH ▼
ConditionExpression: SIG.NONMATCH("http://([\w-]+\.)+[\w-]+(/[\w-./?%&=]*)?","ARG_INPUT")

Action
New + Update & Delete ✗

| No. | ActionName | ActionType | ImplementPlugin | TriggeringRule |
|---|---|---|---|---|
| 1 | ERRORMESSAGE | ERRORMESSAGE | | |
| 2 | LOG | LOG | | |
| 3 | TRIGGER | TRIGGER | | XSS |

Logout

```
"urltemplate":{ "content" : "saas.com/
            myPizzaShop/pizza/{pid}/topping/{tid}",
  "hostname" :
  { "_id_":"H01",
      "content": " saas.com ",
      "filepathnode": [{ _id_":"FPN01",
          "resource":"myPizzaShop",
          filepathnode: [{_id_ :FPN02,
          resource: pizza,
          filepathnode: [{_id_ :FPN03,
              resource: pid,
              isVariable: true,
              variableExpression: ^[0-9]+$,
              filepathnode : [{ _id_ : FPN04,
                  resource : topping,
                  filepathnode : [{_id_ : FPN05,
                      resource : tid,
                      isVariable: true,
                      variableExpression: ^[0-9]+$,
    }] }] }] }] }] }]
```

*FIG. 12*

```
SecRule REQUEST_METHOD "^GET$" chain,
            setenv:var1=true,deny
SecRule REMOTE_HOST "^127\.0\.0\.1" chain,
            setenv:var2=true
SecRule REQUEST_URI "/denied.html" setenv:var3=true
```

FIG. 13

PERFORMANCE EVALUATION RESULT FOR DIFFERENT MODULES ENABLED IN WASP
(1) CONDITION OPERATOR (2) CODECS (3) RESTful REWRITING (4) RESPONSE HANDLER

| MAXIMUM NEW CONNECTIONS PER SECOND | MAXIMUM THROUGHPUT PER SECOND (BYTES) | AVERAGE RESPONSE TIME (ms) | WASP RULES |
|---|---|---|---|
| 382 | 2918863 | 567 | NO RULES |
| 339 | 2567641 | 627 | ENABLE (1) |
| 341 | 2217514 | 640 | ENABLE (1)+(2) |
| 306 | 2302230 | 681 | ENABLE (1)+(3) |
| 295 | 2347862 | 762 | ENABLE (1)+(2)+(3)+(4) |

FIG. 14

```
[{ "rule": [
  { "_id_": "R01",
    "name": "URIVAR1",
    "description": "If URI ends with denied.html,
          then set variable var3 as true",
    "condition": { "value": "STR.ENDWITH(\"REQUEST.URI\",
          \"/denied.html\")" },
    "action": [
      { "actionType": "RECORD",
          "argument": ["var1", "true"] },
      { "actionType": "TRIGGER",
          "triggerRule": [ "R02" ] }
    ] },
  { "_id_": "R02",
    "name": "RemoteHostVar2",
    "description": "if remote host equals 127.0.0.1,
          then set variable var2 as true and trigger Rule R03",
    "condition": { "value": "STR.EQUALS(\"REQUEST.REMOTE_HOST\",
          \"127.0.0.1\")" },
    "action": [
      { "actionType": "RECORD", "argument": [var2", "true"] },
      { "actionType": " TRIGGER", "triggerRule": [ "R03" ] }
    ]},
  { "_id_": "R03",
    "name": "RequestURIVar3",
    "description": "If method equals GET,
          then set variable var1 as true",
    "condition": { "value": "STR.EQUALS(\"REQUEST.METHOD\",
          \"GET\")" },
    "action": [
      { "actionType": "RECORD", "arugment": ["var3", "true"] },
      { "actionType": "TRIGGER", "triggerRule": [ "R04" ] }
    ]},
  { "_id_": "R04",
    "name": "DenyRule",
    "description": "This is a rule to deny message.
          It will be triggered in the rule chain.",
    "condition": { "value": "BOOL.TRUE" },
    "action": [
      { "actionType" : "DENY" }
    ]}
],
"requestmessage": [
  { "_id_" : "AllMsg",
    "urltemplate": { "content": "*" },
    "binding": [{"rule": [ "R01" ]}]
  }
]
}]
```

FIG. 15

| FUNCTION | TOMCAT 7 FILTER | ModSecurity | WASP |
|---|---|---|---|
| ARCHITECTURE DESIGN | IMPLEMENT MULTIPLE FILTERS AND FILTER CHAIN TO ENABLE THE PROTECTION. THE LOGIC OF FILTER CHAIN IS DESCRIBED IN web.xml. THE PROTECTION LOGIC IS HARD CODED IN THE FILTERS. | IMPLEMENT APACHE MODULE AND SECURITY RULES. THE PROTECTIONS ARE DEFINED IN SECURITY RULES WHICH IS INDEPENDENT OF ENGINE MODULE. | IMPLEMENT HRS AND WASP ENGINE TO ENABLE THE PROTECTION. THE PROTECTIONS ARE DEFINED IN SECURITY RULES WHICH IS INDEPENDENT OF WASP ENGINE. |
| LIMITATION TO APPLICATION DEVELOPMENT | DEVELOPER NEED FOLLOW THE FRAMEWORK TO ENABLE THE SECURITY FILTERS IN APPLICATION CODES. | NO LIMITATION TO APPLICATION CODES. | NO LIMITATION TO APPLICATION CODES. |
| CAPABILITY TO PREVENT NEW VULNERABILITY | IMPLEMENT NEW FILTER OR UPDATE THE FILTER CODES TO SUPPORT NEW VULNERABILITY SIGNATURE. | NO NEED MODIFY APACHE MODULE CODES. CREATE OR UPDATE RULES TO SUPPORT NEW VULNERABILITY PREVENTION. | NO NEED MODIFY WASP ENGINE CODES. CREATE OR UPDATE RULES TO SUPPORT NEW VULNERABILITY PREVENTION. |
| RESTful SUPPORT | N/A | SUPPORT THE RESTful URL PATTERN DEFINITION IN REQUEST_FILENAME ELEMENT. NO SUPPORT FOR THE VALIDATION FOR THE INPUT VALUE EMBEDDED IN RESTful URL. | SUPPORT RESTful URL PATTERN DEFINITION AND THE VALIDATION FOR THE DYNAMIC INPUT VALUE EMBEDDED IN RESTful URL. |
| HIERARCHICAL RULE INHERITANCE | N/A | ONLY SUPPORT TO INHERIT DEFAULT RULE SET. | SUPPORT URL BASED RULE INHERITANCE BY DEFINING THE inheritParent ATTRIBUTE TO URL PATH NODE. |
| INTERACTIVE VIRTUAL PATCHING | N/A | DISCUSS THE VIRTUAL PATCHING PROCESS FOR ENGINE RULES. | BASED ON HRL TO IMPLEMENT THE VIRTUAL PATCHING CAPABILITY BY USING APPLICATION CONTEXT INFORMATION AND AppScan TOOL. |
| RULE DEVELOPMENT TOOL | N/A | MANUALLY MODIFY THE RULE TEXT FILES. A PROTOTYPE TOOL FOR RULE CONFIGURATION IS SET UP AS ONE OWASP PROJECT. | IMPLEMENT THE RDT TO DEVELOP WASP RULES, ENABLE VIRTUAL PATCHING AND RULE RE-TESTING. THE RDT TOOL IS A RESTful SERVICE TO MANAGE JSON-based RULES. |

| FUNCTION | TYPE | CPU | RAM | OS |
|---|---|---|---|---|
| WebSphere PROXY SERVER WITH WASP | BLADE SERVER | Intel(R) Xeon(TM) 2 CPU 2.80GHz | 4GB | SUSE LINUX ENTERPRISE SERVER 9 (i586) |
| WebSphere APPLICATION SERVER AND DB2 | BLADE SERVER | Intel(R) Xeon(TM) 2 CPU 2.80GHz | 4GB | SUSE LINUX ENTERPRISE SERVER 9 (i586) |
| LoadRunner | ThinkCenter | Intel Core 2 CPU 2.66GHz | 3GB | WINDOWS SERVER 2003, LoadRunner 8.0 |

FIG. 20

2002
http://saas.com/myPizzaShop/pizza/1/topping/3
http://saas.com/myPizzaShop/pizza/3/topping/4

2004
http://saas.com/myPizzaShop/pizza/{pid}/topping/{tid}

2006
http://saas.com 2008
http://chinabank.com:8080/Account/transferMoney.php?acct=BOB&amount=100

2010
http://chinabank.com:8080/

2012
http://saas.com/myPizzaShop/pizza/{pid}/topping/{tid}

2014
http://saas.com/myPizzaShop/pizza/order.php?quatity=1&type=cheese
http://saas.com/myPizzaShop/pizza/enquire.php
http://saas.com/myPizzaShop/pasta/order.php?size=1&type=meat 2016
http://saas.com/myPizzaShop/pizza/enquire.php 2018
http://www.OnlineSFA.com/action?type=qOpp
http://www.OnlineSFA.com/action?type=qOpp&stype=1
http://www.OnlineSFA.com/action?type=qOpp&stype=2

2020
http://saas.com/myPizzaShop/pizza

HIERARCHICAL RULE DEVELOPMENT AND BINDING FOR WEB APPLICATION SERVER FIREWALL

FIELD OF THE INVENTION

The present invention relates to the electrical, electronic and computer arts, and, more particularly, to web infrastructures and the like.

BACKGROUND OF THE INVENTION

In a typical Web application a client, such as a browser, interacts with a Web server by exchanging a series of messages that are made up of hypertext transfer protocol (HTTP) requests and responses. An attacker often exploits vulnerabilities that exist in a Web application to launch attacks. Some of the predominant types of attacks against Web applications include Cross-Site Scripting (XSS), SQL Injection (SQL-I), and Cross-Site Request Forgery (CSRF) attacks.

SUMMARY OF THE INVENTION

Principles of the invention provide techniques for hierarchical rule development and binding for a web application server firewall. In one aspect, an exemplary method for operating a web application server firewall includes the steps of intercepting at least one of an HTTP request message and an HTTP response message; and identifying a corresponding HTTP message model, based on the intercepting step. The HTTP message model includes a plurality of message model sections. Additional steps include parsing a representation of the at least one of an HTTP request message and an HTTP response message into message sections in accordance with the message model sections of the HTTP message model; and binding a plurality of security rules to the message model sections. The plurality of security rules each specify at least one action to be taken in response to a given condition. The given condition is based, at least in part, on a corresponding given one of the message sections. A further step includes processing the at least one of an HTTP request message and an HTTP response message in accordance with the plurality of security rules.

In another aspect, an exemplary method for developing rules for a web application server firewall includes the steps of anticipating at least one of an HTTP request message and an HTTP response message likely to be processed by the web application server firewall; and building a corresponding HTTP message model, based on the anticipating step. The HTTP message model includes a plurality of message model sections. An additional step includes developing a plurality of security rules each specifying at least one action to be taken in response to a given condition. The given condition is based, at least in part, on a corresponding section of an actual message. A further step includes binding the plurality of security rules to the message model sections. In some cases, rather than carrying out the anticipating step, such step is performed externally and the method includes building the HTTP message model based on the at least one of an HTTP request message and an HTTP response message anticipated from the externally-performed step as likely to be processed by the web application server firewall.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

Hierarchical rule development and binding can make rule configuration much more easy and accurate, and make rule definitions much better align with web application logic according to its hierarchical business needs and technical design Hierarchical rule development and binding can make security patching for web applications more efficient without any changes of the web application itself These and other features and advantages of the present invention will become apparent from the following detailed description of illustrative embodiments thereof, which is to be read in connection with the accompanying drawings.

BRIEF DESCRIPTION OF THE DRAWINGS

FIG. 5 depicts an exemplary HTTP request, according to an aspect of the invention;

FIG. 7 presents an exemplary JSON representation of an HTTP request model, according to an aspect of the invention;

FIG. 8 presents an exemplary rule definition in a rule development tool, according to an aspect of the invention;

FIG. 9 presents an exemplary HTTP message and its hierarchical logic on URL, and rule binding to the HTTP message sections in a rule development tool, according to an aspect of the invention;

FIG. 11 shows an exemplary JSON representation for a URI template, according to an aspect of the invention;

FIG. 12 presents an exemplary rule sample for ModSecurity, according to an aspect of the invention;

FIG. 13 presents performance evaluation results for different modules enabled in web application security protection, according to an aspect of the invention;

FIG. 14 presents an exemplary rule instance in Hierarchical Rule Schema (HRS) for the ModSecurity rules of FIG. 12, according to an aspect of the invention;

FIG. 15 is a table showing a comparison for a Tomcat & Filter, ModSecurity, and web application security protection, according to an aspect of the invention;

FIG. 20 shows certain URLs and the like, according to an aspect of the invention.

DETAILED DESCRIPTION OF PREFERRED EMBODIMENTS

Figure 1:
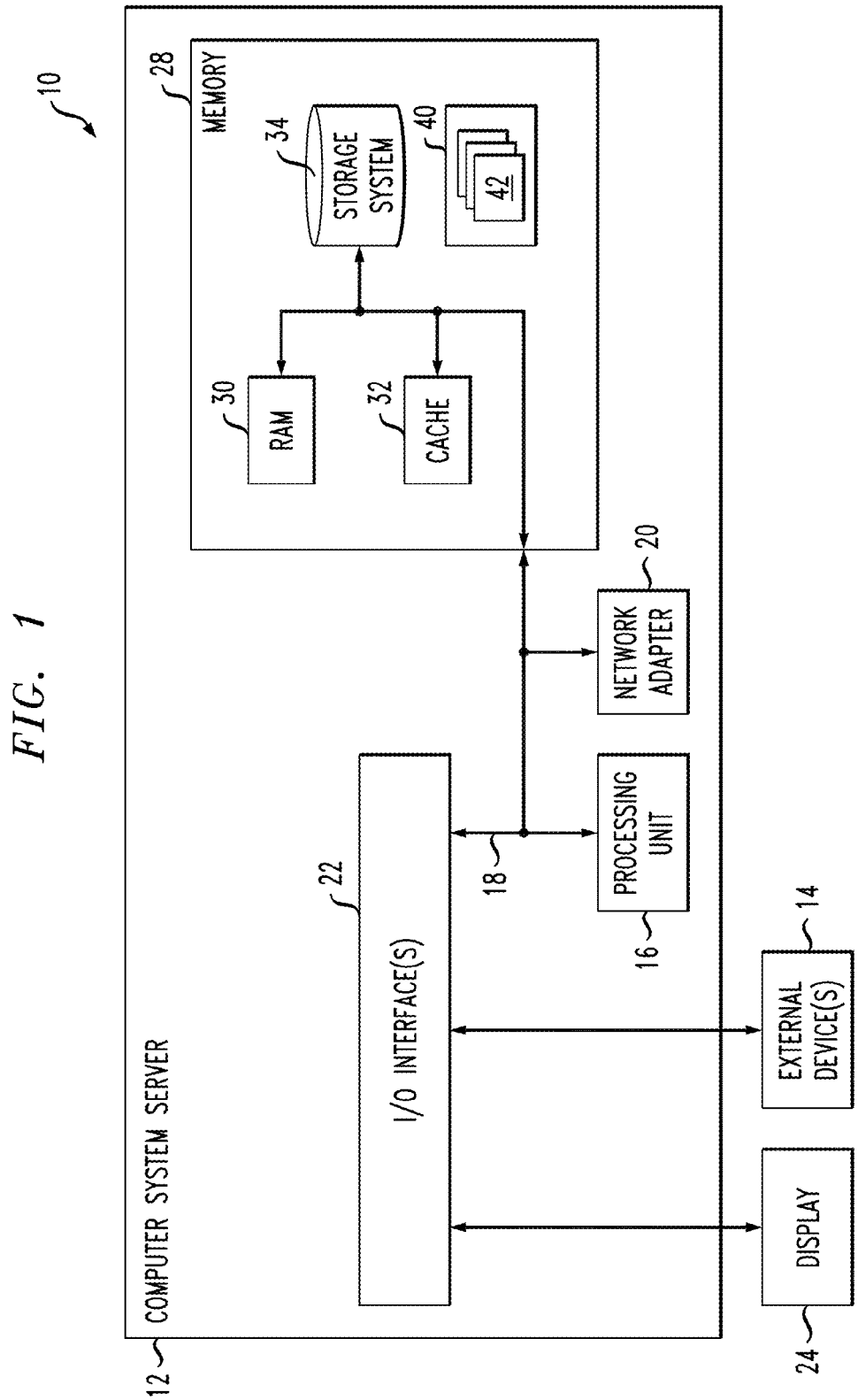
FIG. 1 depicts a cloud computing node according to an embodiment of the present invention.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 1 is also generally representative of servers or other general purpose computers that can be used in connection with one or more embodiments of the invention in environments other than a cloud environment.

Figure 2:
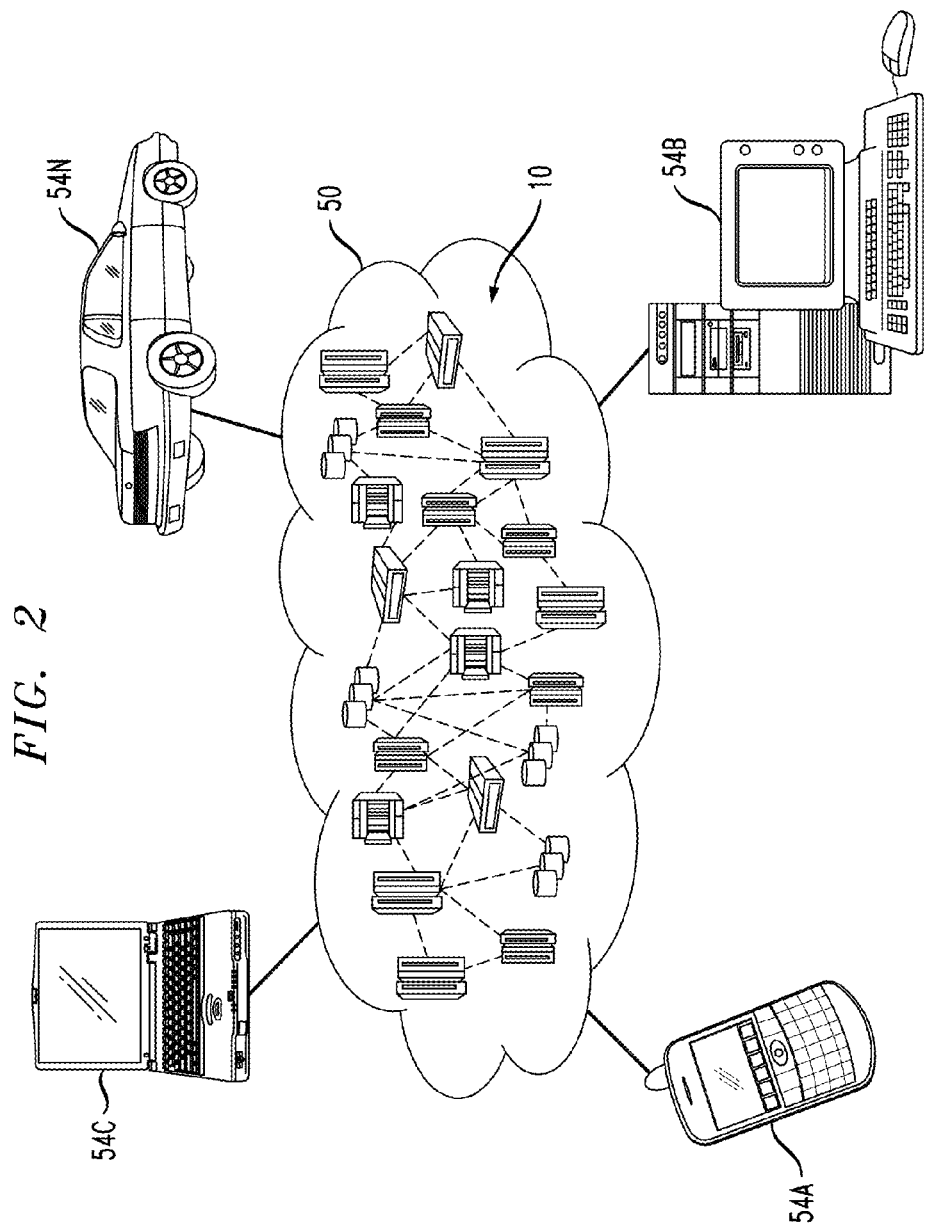
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
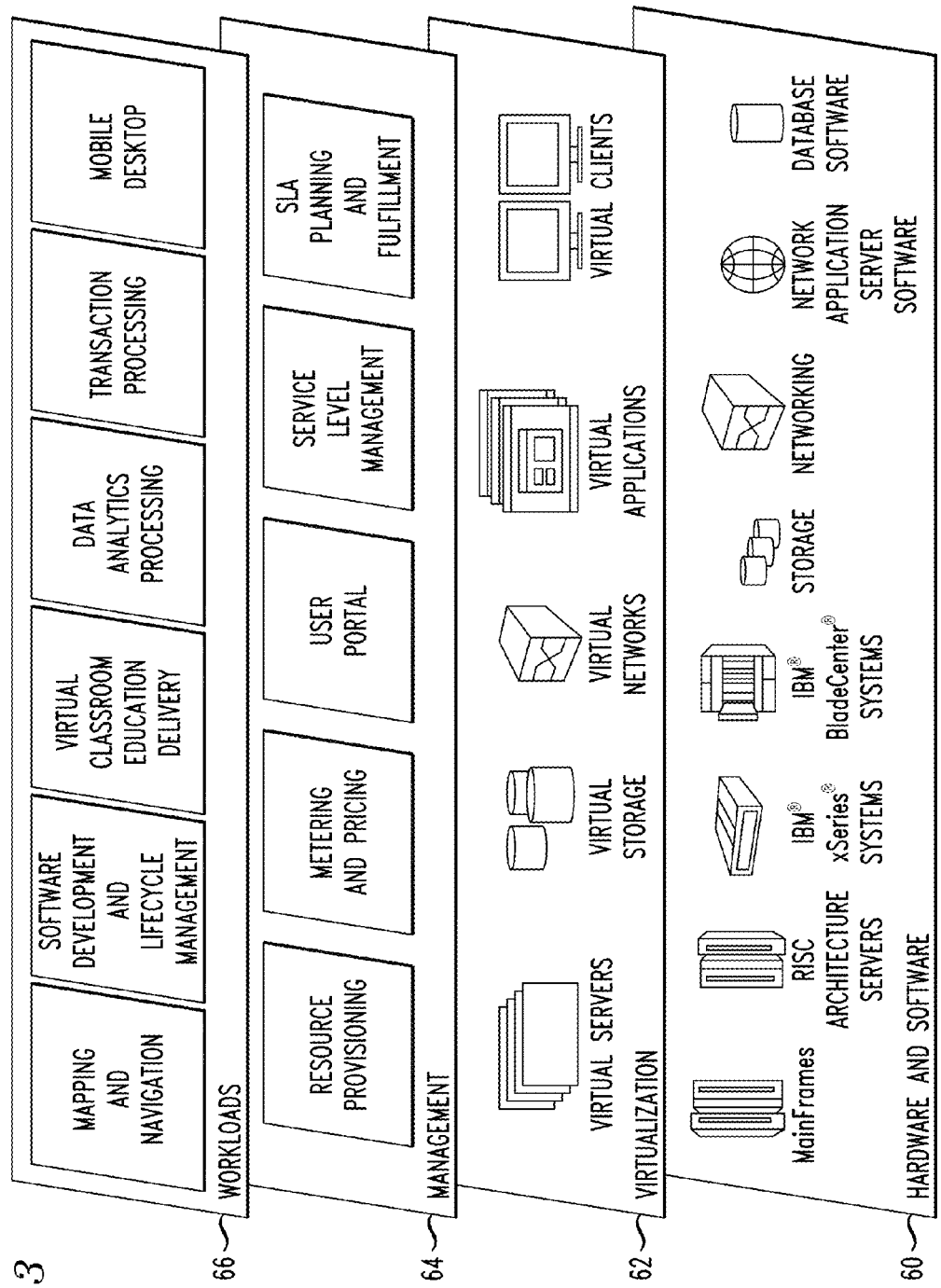
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

One or more embodiments provide techniques for design and implementation of hierarchical rules for a web application server firewall. A Web Application Server Firewall (WASF) is a firewall that is enabled inside a Web Application Server, such as a Tomcat server (available from the Apache software foundation), to filter unwanted messages and protect Web applications running on the server. Unlike other kinds of firewalls, a WASF can exploit the richer semantics of the Web applications, and thereby provide a fine-grain protection. One or more embodiments herein provide design and implementation of a fine-grain and hierarchical rule development for a WASF. There are two parts to hierarchical rule development: (1) Hierarchical rule schema and (2) Rule development tool. The hierarchical rule schema supports a number of features, including late binding of rules with messages and ability to handle URI templates and RESTful requests ("REST"=representational state transfer; a RESTful web service (or RESTful web API is a simple web service implemented using HTTP and the techniques of REST). To improve the usability of developing and deploying firewall rules, one or more embodiments provide a Rule Development Tool (RDT) that provides several capabilities for developing and deploying rules, searching for similar rules, analyzing conflicts among rules, transforming rules from one format to another one, and interactive virtual patching. One or more embodiments of WASF are suitable for deployment in products and in a cloud environment.

As noted above, in a typical Web application a client, such as a browser, interacts with a Web server by exchanging a series of messages that are made up of hypertext transfer protocol (HTTP) requests and responses. An attacker often exploits vulnerabilities that exist in a Web application to launch attacks. Some of the predominant types of attacks against Web applications include Cross-Site Scripting (XSS), SQL Injection (SQL-I), and Cross-Site Request Forgery (CSRF) attacks.

A Web Application Server Firewall (WASF) is a piece of software installed inside a Web Application Server (WAS), such as a WebSphere® Application Server (registered mark of International Business Machines Corporation, Armonk, N.Y., USA (hereinafter IBM)) or a Tomcat server, to filter inbound and outbound Web content of the WAS using filter or firewall rules. Unlike a typical network or proxy server firewall, a WASF can exploit the richer semantics of the underlying Web applications to provide fine-grain protection of the Web applications running on the server.

A significant aspect in WASF is how and at what level of Web application semantics can be exploited without modifying the Web application itself. Imagine that a Web application developer has released a Web application, but has found vulnerability in the application. Unfortunately due to the release cycle, the developer cannot modify the application. One significant question is whether WASF can be used to provide fine-grain protection of the vulnerable application without any loss of functionality of the application. Modern Web applications that are based on AJAX (asynchronous JavaScript and XML) and REST contain rich content, services and hierarchical resources. A skillful attacker can launch sophisticated attacks targeting specific vulnerable resources and services. Coarse-grain firewall protection can often filter such attacks, but it can also prevent rich functionality provided by the underlying applications.

One or more embodiments provide fine-grain hierarchical rule development for a WASF, referred to herein as Web Application Security Protection (WASP), to address the problem of fine-grain protection of Web applications without modifying the vulnerable application and preventing loss of any its functionality. One exemplary solution includes two significant parts: (1) a Hierarchical Rule Schema (HRS) for writing flexible, fine-grained, and hierarchical firewall rules, and (2) a Rule Development Tool (RDT) to quickly develop rules to protect against zero-day attacks. The RDT provides several capabilities to the application developer and security administrator to develop, including searching for similar rules, parsing and modeling Web application configurations which often contain the application layout, integration with black-box testing tool such as AppScan (available from IBM), transforming rules from ModSecurity (well-known open source web application firewall) to the HRS, and the like.

Note that WASP is a non-limiting example of a web application firewall; such firewalls per se are known to the skilled artisan and given the teachings herein, the skilled artisan will be able to implement aspects of the invention in one or more web application firewalls.

In one or more embodiments, the HRS is based on two design principles: (1) ability to support fine-grain rules to protect hierarchical Web resources and services and (2) late binding of rules to message types. A typical Web applications based on AJAX and REST maintains a large collection of hierarchical resources and services. A fine-grain hierarchical rule schema is necessary for effectively handling RESTful requests. Consider the example 2002 in FIG. 20.

A RESTful Web application that processes the GET requests for the URLs 2002 will typically not create one static page for each resource. The Web application will construct a layout for the URLs using a URI Template mechanism, described using configuration files or annotations. A URI Template is a mechanism that allows one to specify a URL to include parameters that is substituted before the URL is resolved. Using a URI Template mechanism an application can create the template 2004 for the example 2002, where {pid} and {tid} are resource variables that map to 1 and 3, respectively for the first URL (and will map to 3 and 4, respectively for the second URL). To handle such URI template-based HTTP requests requires the ability to model hierarchical rules and also an understanding of the back-end application structure. Using RDT, in one or more embodiments, parse and explore the configuration files and deployment descriptor of a back-end application and model the underlying hierarchical application structure.

In one or more embodiments, using hierarchical rule language, model the above URI Template, obtained by parsing configuration files, as at 2006, which represents the instance of Hostname. Pizza {pid}, topping, and {tid} are instances of FilePathNode. For resources {pid} and {uid} also set the attribute isVariable to be true and the variableExpression is set ^[0-9]+$ indicating that it matches numerical value pattern. Another point is to set the attribute inheritParent to the node tid, which means the rule bound to the parent node such as topping will be inherited and applied to the child node. The above URI Template is then represented using JSON (JavaScript Object Notation). JSON is a simple and flexible language that is used in one or more embodiments for representing not only core elements of the rule language; meta-information about various parts of the rule elements that provide additional capabilities can also be expressed.

The HRS allows late binding of rules with message components on which the rules operate. To further elaborate the late binding principle, consider a typical HTTP GET request. It includes several components, such as headers, URL, cookies, and the like. One or more rules can be bound to each of these components. A rule includes two parts: condition and action. A rule typically has to be bound to a message before it can be triggered. In other words, an unbounded rule can typically never be triggered, even if its condition is true always. Now, when a condition of a bounded rule is true, then the corresponding action is executed. Using RDT a security administrator can develop new rules, and bind existing rules to different components of a message. Late binding provides flexibility, wherein a security administrator can decide how the rules are bound to messages.

A non-limiting exemplary embodiment implements WASP using a J2EE (JAVA enterprise edition) framework and so the exemplary WASP can potentially be deployed inside any J2EE Web application server. In non-limiting experiments, WASP has been integrated into WebSphere application server (WAS) and Tomcat server and has also been deployed in a Cloud environment. Several empirical results that highlight different features of WASP, including results that compare and contrast WASP with ModSecurity and various performance results, are presented herein.

Exemplary WASP Design

Figure 4:
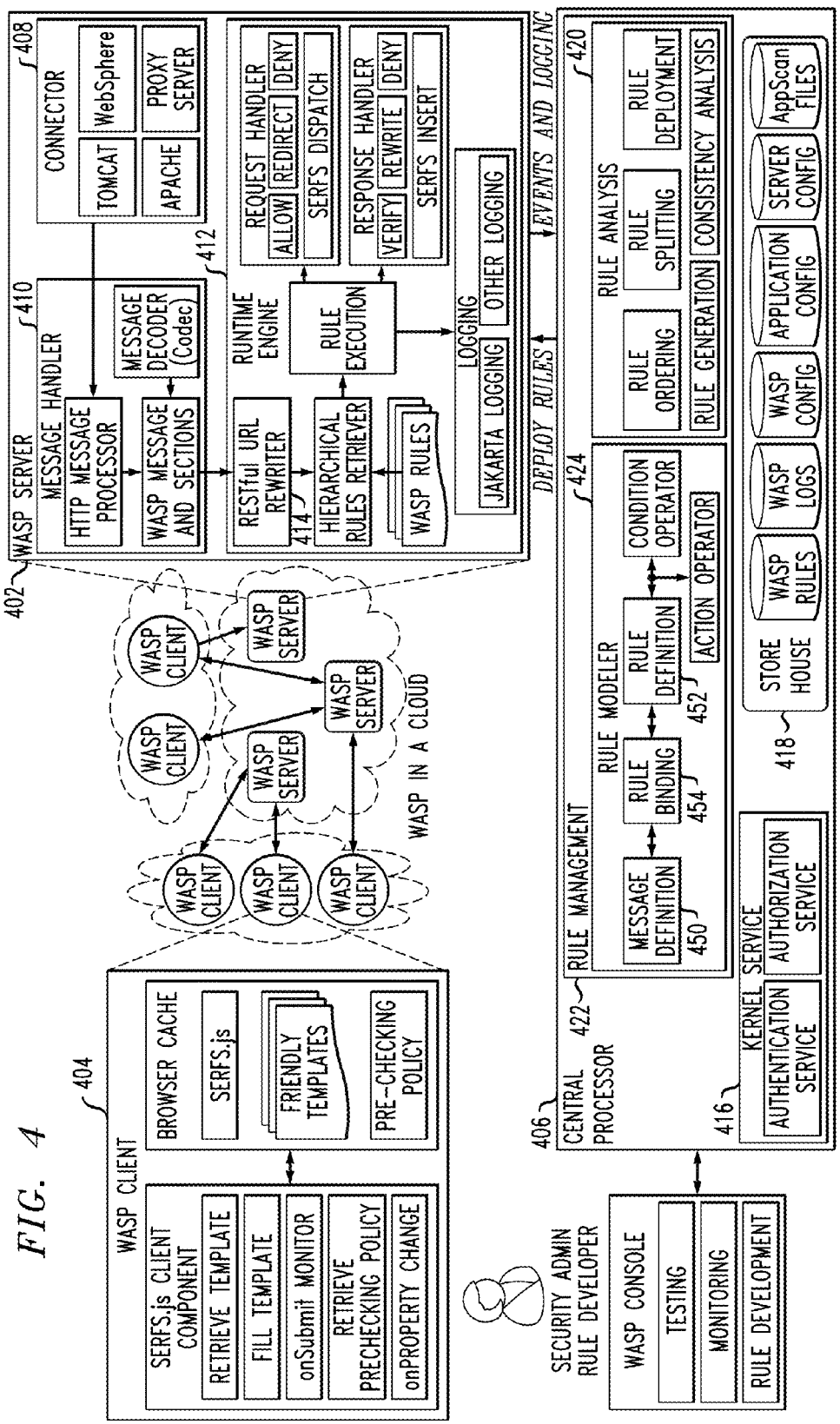
FIG. 4 depicts an exemplary web application security protection architecture in a cloud environment, according to an aspect of the invention.

The exemplary design of WASP provides a flexible WASF for new enterprise models such as the Cloud environment. FIG. 4 shows the overall system architecture of WASP. The exemplary WASP embodiment includes WASP Server 402, WASP Client 404, and WASP Central Processor 406.

WASP Server:

The WASP Server 402 processes HTTP request and response messages and applies rules to filter bad messages and allow good messages. The basic filtering process includes first intercepting the HTTP request/response messages, constructing WASP internal message objects based on a message model (as described in below), and applying filtering rules deployed inside the engine. The WASP Server shown in FIG. 4 in turn includes a connector 408 which essentially captures the HTTP requests and responses, and then forwards them to the message handler 410. A non-limiting exemplary embodiment supports Tomcat server and WebSphere Application Server (not separately numbered in block 408). In some cases, WASP can be employed in IBM WebSphere proxy server and Apache server, and in these deployments can be used as a proxy firewall that does not exploit the richer application semantics. One or more embodiments do not modify the original messages, but instead create a copy of the message and forward to the Message Handler 410.

The Message Handler 410 parses the messages forwarded by the Connector and creates the WASP message object (described in detail below). For each request/response message, multiple sections will be created based on the HTTP message protocol, including the Header Section, Cookie Section, Query String Section, Body Section, and so on. Some encoded characters, such as base64 value, Hex value, and so on, still can launch the XSS attack especially when these characters are embedded in a requested URL as the query string. Thus, the decoder module is used to sanitize the input values if it contains different encoding characters.

The Runtime Engine 412 is a significant module that processes the request/response based on the security rules. The RESTful rewriting module 414 is used to support RESTful URL and URI templates. To obtain the context of the RESTful requests, one or more embodiments import and analyze the application configuration files such as web.xml, application.xml, and the like, to create the regex (regular expression) pattern for the RESTful URLs and URI templates. Then, based on the URL regex pattern, map the dynamic RESTful URL to the common static one, then index the rules based on the common static one. In this manner, there is no need to create the security rules for each dynamic URL which has the same URL pattern, so that the rule configuration cost can be reduced. After indexing the rules based on the request URL pattern, process each section in the request/response message based on the security rules. If one rule is triggered, the corresponding actions defined in the rule will be enabled, such as denying the request, logging, responding with a friendly error message, and so on.

WASP Client:

One salient feature of WASP is that in the new enterprise model client side applications are considered as part of the enterprise model. WASP Client provides a number of capabilities, such as user friendly error report when requests are blocked, client pre-checking of rules, and the like.

WASP Central Processor:

The WASP Central Processor 406 is where offline analysis, rule development, rule testing, and rule deployment are performed. The Central Processor includes Kernel Services 416, Store House 418, Analysis Engine 420 and Rule Management 422.

Kernel Services:

A Cloud environment will typically host many different kinds of application services with different security requirements. The Kernel Services 416 provide user-centric access to WASP internals so that firewall rules and other log information for one application is not exposed to users of another application.

Store House:

In one or more embodiments, the Store House 418 stores all of the relevant information, including rules, analysis results, abstraction of application configuration, and so on. One or more embodiments store most of the information as resources using JSON and/or XML (extensible markup language), and provide a RESTful API (application program interface) to access and update the resources. Some embodiments use APACHE WINK as the RESTful framework. As an example, a rule can be obtained with the specified ID as /rule/{ruleID}, or get all the rules in the ruleset with the specified ruleset ID as /ruleset/{rulesetID}/rules. Also for the rules binding to the different sections of the WASP message, the rules can be obtained from the interface as /message/{messageID}/section/rules. The interface /message/95601/header/rules means it can get all the rules that are bound to the header section in the message with the message ID 95601.

Rule Management:

Rule Management 422 includes the Rule Modeler module 424 and Rule Analysis module 420. The Rule Modeler 424 is used to model the HRS, including the message model and rule model, which is discussed further below.

HTTP Message Model

Figure 6:
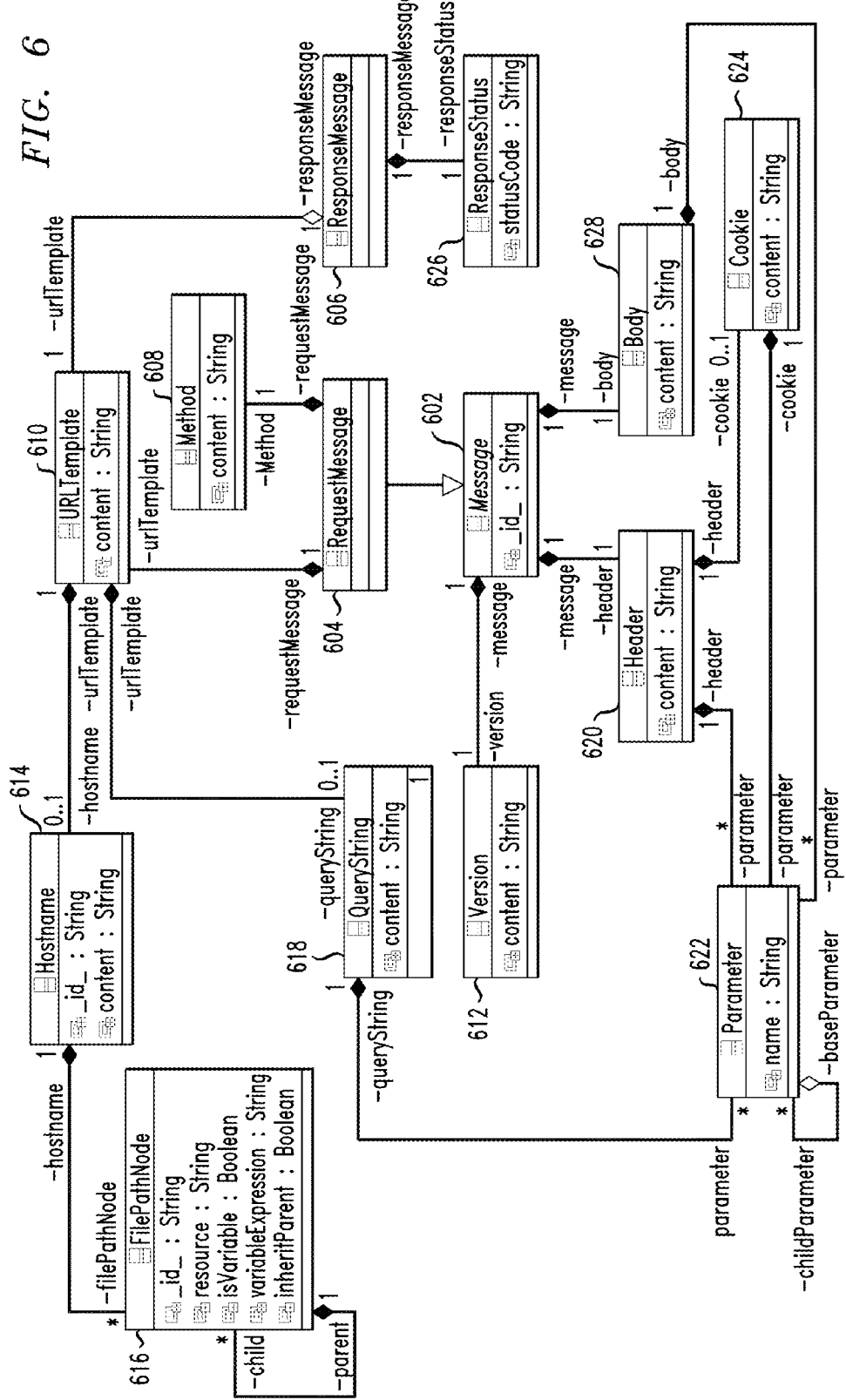
FIG. 6 depicts an exemplary HTTP message model, according to an aspect of the invention.

Rather than developing a new surface syntax to express rules, in one or more embodiments, WASP uses JSON (JavaScript Object Notation) as the underlying representation for rules. (One or more embodiments also support XML schema representation.) The HRS includes: (1) HTTP Message Model as seen in FIG. 6 that defines the core model of the HTTP message structure, (2) Rule Model of FIG. 8 that can be used for writing firewall rules, and (3) Message Rule Binding of FIG. 7 which is desirable to determine the set of rules that should be triggered at runtime for a given message. In one or more embodiments, the basic format of HTTP request and response messages includes (1) the initial line, (2) a sequence of header lines, (3) a new blank line, and (4) the body. The initial line for a request message typically contains one of the HTTP methods (such as GET, POST, HEAD, and the like). The initial line for a response message typically contains status information that includes status code. FIG. 5 illustrates an example of a POST request.

Figure 9:
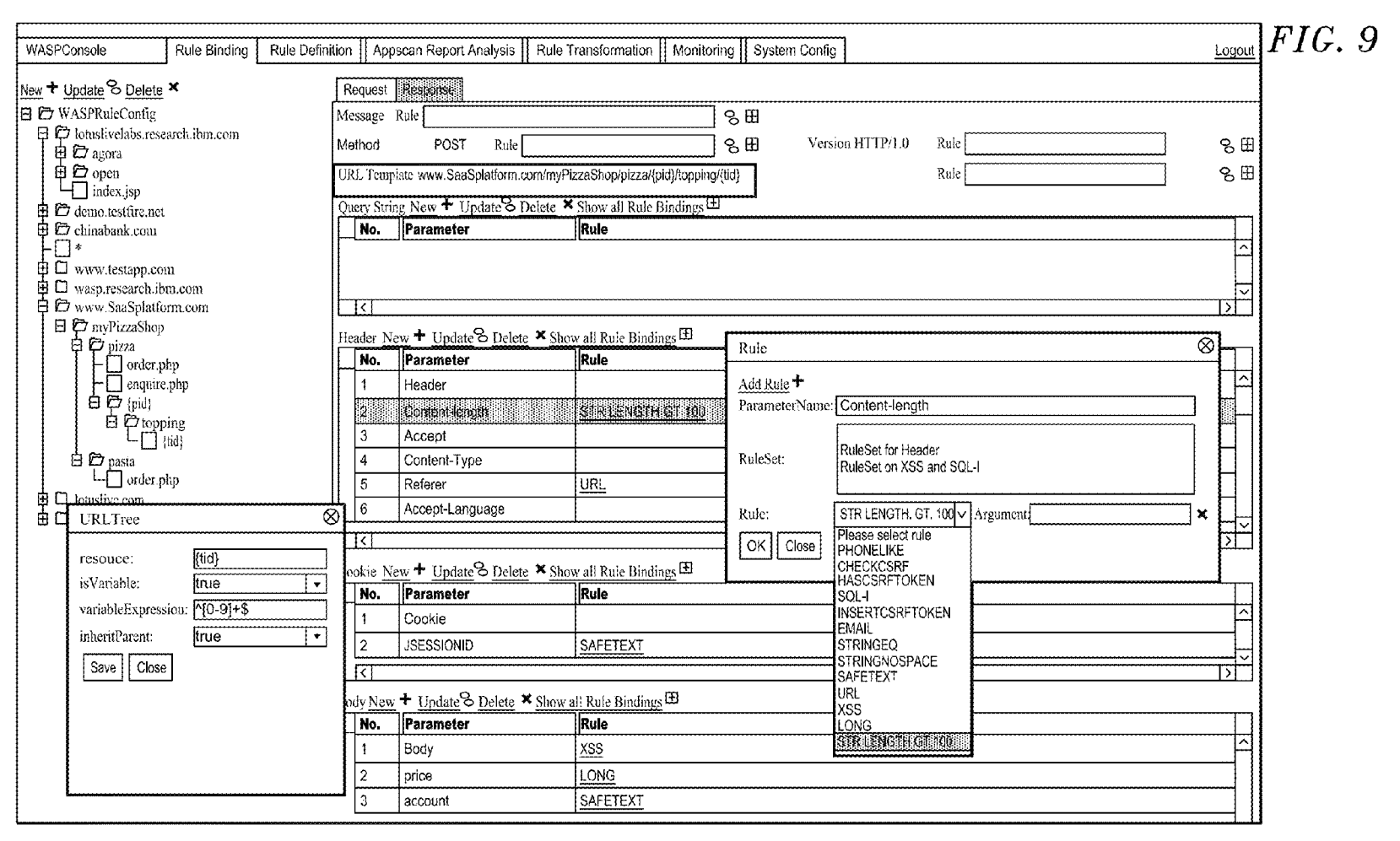

It is worth noting at this point that FIGS. 8 and 9 are pages from an exemplary web application (the WASP console of FIG. 4). This application can be implemented, for example, in JSP, Java, Servlet and HTML. FIG. 8 shows exemplary detailed definition of one rule. FIG. 9 shows rule binding; the right block indicates how to bind rules or rulesets onto http message sections, while the left block shows the hierarchy structure in URL (i.e., who is the parent FilePathNode, and whether inherit rules from parent).

The overall HTTP message model using UML (Unified Modeling Language) is shown in FIG. 6. The root of the HTTP message model is the abstract element called Message 602. The RequestMessage and ResponseMessage 604, 606 are concrete types of Message element, and they correspond to HTTP request and HTTP response messages. Recall that the initial line of an HTTP request contains method, URL, and version; these are represented as Method, URLTemplate and Version elements 608, 610, 612. The Version element is used to represent HTTP version number in both HTTP request and response and so it is part of in the Message element (denoted using solid diamond symbol). A Method element can be one of GET, POST, PUT, DELETE, and HEAD. The URLTemplate element is split into HostName element 614, a sequence of FilePathNode elements 616 and a QueryString element 618. Notice that URLTemplate is part of RequestMessage (denoted by solid diamond symbol), whereas URLTemplate is referenced by ResponseMessage (denoted by plain diamond symbol). The distinction is appropriate for indexing rules when response messages are processed.

Recall that each HTTP request and response includes a header section, and this can be modeled using the Header element 620. The Header element can be considered to be a set of name-value pair represented as a set of Parameter elements 622. Notice that in the model cookies are modeled using the Cookie element 624; and the reason for this is that they typically contain significant elements (such as session information and authentication information) that are needed for writing filtering rules against cookies. Once again a Cookie element includes a set of name-value pairs and so they are modeled as a set of Parameter elements. The QueryString element, which is part of the URLTemplate element, is also modeled as a set of name-value Parameter elements. Finally, when the value of the Content-Type, defined in the HTTP request header, is application/x-www-form-urlencoded, the message body will also be name-value pairs, and therefore they are modeled as a set of Parameter elements. In an exemplary WRS different types are handled for the body. The Content-Type element defines the content type of the body. Unlike the RequestMessage element, the ResponseMessage element includes a ResponseStatus element 626. The statusCode attribute can be any of the status code as defined by the well-known IETF HTTP protocol standard. The ResponseMessage element also includes Header element, Version element, and Body element 628.

Consider the URL elements of an HTTP request, which can be modeled as a URLTemplate element. As shown in FIG. 6, each URLTemplate element 610 includes three parts: (1) Hostname element 614, (2) sequence of FilePathNode elements 616, and (3) QueryString element 618. The QueryString includes Parameter element 622 that represents the name-value pairs. Now consider the HTTP request URL 2008. Element 2010 is an instance of the Hostname element. The resources Account and transferMoney.php are instances of the FilePathNode element. Finally, acct=BOB&amount=100 is an instance of QueryString. Notice that QueryString includes two name-value pair of Parameter elements separated by &:acct=BOB and amount=100.

Each FilePathNode includes several attributes such as isVariable, variableExpression, and inheritParent, explained below. To summarize, in one or more embodiments, the HTTP message model is concise and is semantically rich for developing rule models. The example in FIG. 7 illustrates a JSON representation of an HTTP message model instance for the example shown in FIG. 5.

Rule Model

Figure 10:
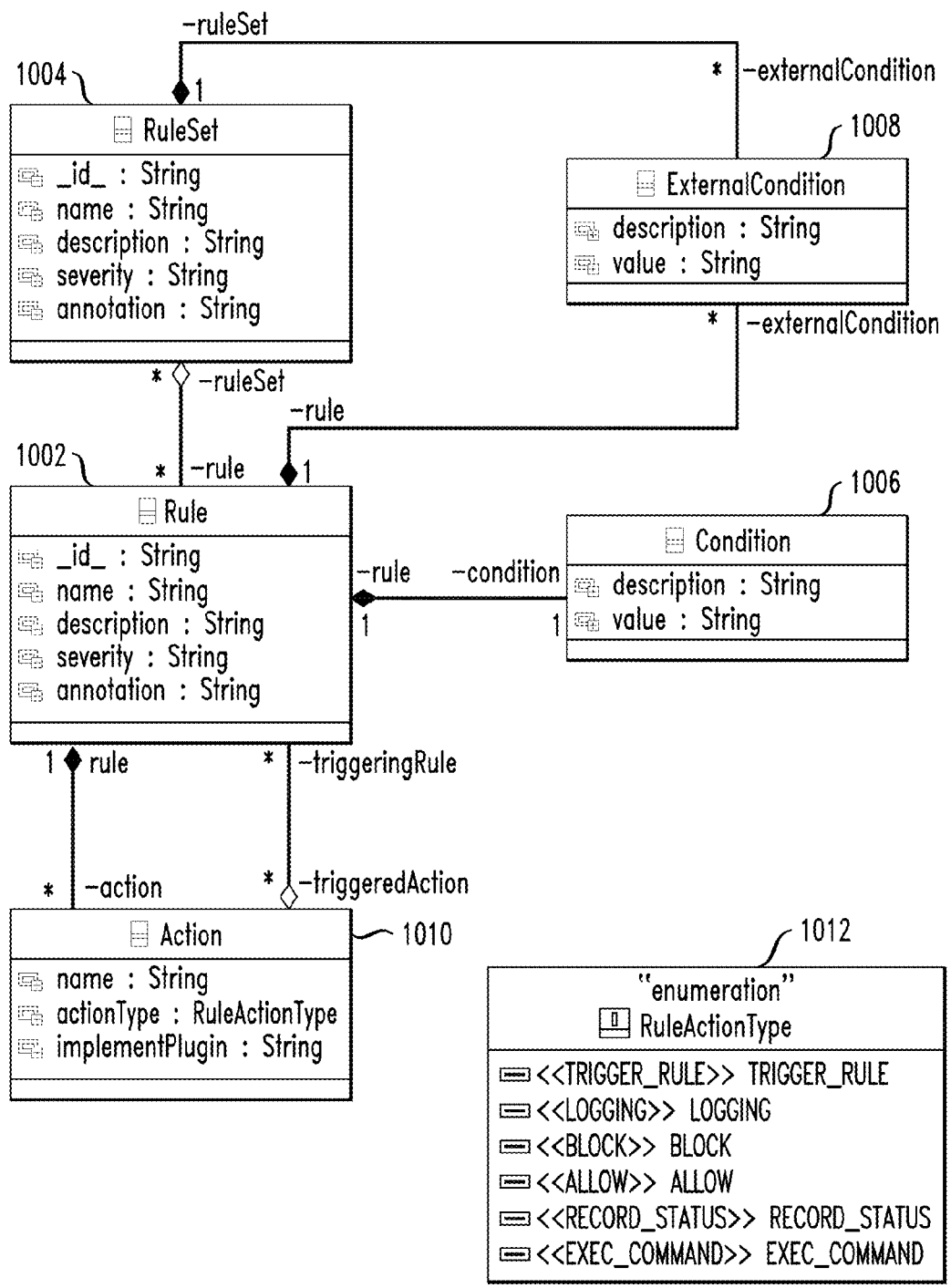
FIG. 10 shows an exemplary rule and rule set model, according to an aspect of the invention.

FIG. 10 shows the UML class diagram for the HRS rule model. A security administrator uses RDT for developing rules. FIG. 8 shows a screen-shot of rule development using RDT. In one or more embodiments, there are three significant parts in the rule model. The first part includes Rule and RuleSet elements 1002, 1004; the second part includes Condition and ExternalCondition elements 1006, 1008; and the last part includes the Action element 1010.

Rule and RuleSet element: The basic structure of a rule will look like:

R01: if condition then action.

Whenever the condition holds true the corresponding action is executed. The following is an example of a rule R01:

if (NUM.GT(STR.Length(Request.Header.Parameter[Content-Length]), 100)) then Action.Log.

In the above rule, Request.Header.Parameter[Content-Length] identifies a particular header parameter and a check is made whether its string length is greater than 100. Notice the way the HTTP message model elements are accessed. Recall from FIG. 6 that Parameter is a name-value type of model element and Content-Length is the name and the notation Parameter[Content-Length] returns its value. An instance of a Rule element typically has three main parts: (1) a Rule identifier that identifies the rule, such as R01, (2) a Condition such as NUM.GT(STR.Length (Request.Header.

Parameter[Content-Length]), 100) and (3) Action, such as Action.Log. In one or more embodiments, the WASP rule schema contains several pieces of meta-information, such as name, _id_, description, and the like; those are useful for writing rules, and JSON is used to write rules. One or more embodiments group together a set of rules that have some common purpose using RuleSet elements.

Condition and Action element:

One or more embodiments use the Condition element to model rule conditions. One or more instances support a number of different condition operators such as regex matching, numeric or string comparison. One or more cases use the Action element to model actions of a rule. A rule can trigger more than one action when the corresponding condition of the rule is satisfied. The attribute actionType is used to represent the action type. The action types such as Block, Allow, and Log are straightforward to understand. The Record(variable, value) is useful when the runtime engine wants to manage state across different rule executions, for instance, supposing it is desired to know if a particular rule R01 had fired previously. In this case, when rule R01 is fired its status will be recorded in a variable using Record(variable, value) action. The action type Execute(path) will execute an external command referenced by a fully qualified path. The action type Rewrite is useful to rewrite values of certain elements, such as rewriting the URL value. See generally block 1012.

Hierarchical Rule Binding and Inheritance

In this section two concepts are discussed; the first is hierarchical rule binding and the second is rule inheritance.

Rule Binding:

Based on the HTTP message model and the rule model, the next concept that is significant for a security administrator is to understand how to bind rules to HTTP messages. In one or more embodiments of WASP, a rule can triggered only if it is bound to some message element. In other words, unbounded rules can never be fired even if the condition of the rule is always true. A security administrator can use the RDT to bind rules to HTTP message models. FIG. 9 illustrates a screenshot of rule binding using RDT (FIG. 14 illustrates binding using JSON format). The first step in the RDT is to create a new template based on the HTTP message model. The RDT will present the new template of the HTTP message model to a security administrator and the template will highlight all the elements of the HTTP message model. There are one or more entries for each element that can be filled in by the security administrator. For instance, for the URLTemplate element, the security administrator can fill in a URL that includes host name and file path nodes. The file path node could contain resource variables (such as pid, as discussed above). One or more embodiments use the URLTemplate instance as an index or key during runtime to retrieve the current HTTP model and/or template instance. For the Header element, one or more embodiments also create the set of headers that are allowable for the current HTTP model instance. Once the instances of all the elements of a new template are created, the security administrator can then bind or associate one or more rules to each element by either using a pre-existing set of rules or by developing new rules. For instance, assume that Content-Length header element is created for the following URL template instance 2012.

Assume that the following rule is associated:
If (NUM.GT(STR.Length(Header.Parameter[Content-Length]), 100)) then Action.Log.

At run time, retrieve the HTTP message template instance using the aforementioned URL as index and then fire all the rules that are bound to various element instances. It should be noted that normalization of the message contents are usually required to be implemented in the WASF engine before executing the rules.

Web application developers often want the ability to express the layout of URLs that their application can respond to. To further elaborate, consider the URLs 2002 that a particular Web application will handle. The Web (REST) application that processes the GET requests for the URLs 2002 will typically not create one static page for each resource. The Web application will construct a layout for the URLs, and using URLTemplate the template can be created as at 2004, where {pid} and {tid} are resource variables. Model the above URLTemplate using the model as follows: URL 2006 represents the instance of Hostname, pizza, {pid}, topping, and {lid} are instances of FilePathNode. For resources {pid} and {uid}, also set the attribute isVariable to be true and the variableExpression is set to ^[0-9]+$ indicating that it matches the numerical value pattern. The aforementioned URLTemplate can be represented using JSON as shown in FIG. 11.

Rule Inheritance:

Next consider how to inherit rules that are written for parent parts of the HTTP model. To understand the notion of parent, use a URL structure to build a URL tree model. The motivation for inheritance is that most Web applications have a hierarchical structure. For instance, the web.xml file, which contains the configuration of a Web application, describes a tree-like structure for a Web application. To illustrate this further consider the URLs 2014 that are part of a sequence of HTTP messages.

A security administrator can write a set of rules for the resource "pizza" and this set of rules could apply to all descendants of the pizza node in the above URLs. In other words both order.php and enquire.php can inherit this rule. Now, when an HTTP message with URL 2016 arrives, construct an instance of the HTTP message model. The run time will then use the URL to access the message model for enquire.php and if the inheritParent attribute is set to true for the file path node enquire.php, the rule bound to "pizza" will be inherited and applied to HTTP message model elements.

A second kind of rule inheritance that is supported in one or more embodiments is called the parameter inheritance. To further explain parameter inheritance, consider a Web application that provide the three related URLS 2018. The first of these URLs is the base URL that provide base query opportunity function. The second and third of these URLs with different stype provide two different techniques for a querying opportunity; say, stype=1 is a query by name and stype=2 is a query by time. From a business logic point of view the functions corresponding to the second and third of the URLs are subtype functions of the first URL. Thus, from a security point of view, the second and third URLs can inherit rules from the base URL. One or more embodiments model such rule inheritance for parameters by modeling parameters as a hierarchical structure.

Rule Transformation and Chaining

One or more embodiments of WASP currently provide capabilities to transform rules from the ModSecurity format to HRS and also from HRS to the IBM DataPower firewall rule format. FIG. 14 shows the HRS for the ModSecurity security rules shown in FIG. 12. The rule chaining in HRS is more expressive than the linear chaining rule in ModSecurity. In HRS, one or more embodiments follow the classical forward chaining semantics, where one or more conditions that are shared between rules are considered to be chained. Rules are chained in a tree-like fashion using trigger action type. An action can contain more than one TRIGGER action. One or more embodiments share the conditions between chained rules, and therefore the same condition is evaluated once for all rules. The ModSecurity chain rule for disruptive actions, such as deny action, is restricted to the first rule in the chain, thereby creating unexpected side-effects. For instance, in ModSecurity a request will be denied only when all three rules in the chain trigger and all three non-disruptive actions that set variables will be executed. In one or more embodiments, the deny action is the last rule of the chain. In HRS all actions are performed as though they are standalone rules. This allows one to compose rules via chaining. One or more embodiments separate the deny rule R04 and its condition is set to true, as seen in FIG. 14. Recall that for a rule to be triggered it should also be bound to a message. For HRS rule chaining only the first rule in the chain R01 needs to be bound to a message part, such as content, and the rest of the rules in the chain are triggered as a consequence of the chaining.

WASP Functionality

By way of a non-limiting exemplary evaluation of the functionality of WASP, compare WASP with two open source WAFs, namely, the Tomcat 7 filter and the aforementioned ModSecurity. First, evaluate the architecture design, the limitation for application code development if enabling WASF function, and the capability to prevent new vulnerability. As shown in the table of FIG. 15, it has been found that for WASP and ModSecurity, the rule definition is independent of the rule engine. It is possible to create or update the rules to prevent a new vulnerability in WASP and ModSecurity, and the firewall function is transparent to the applications, meaning that no modification to application codes is needed. For the Tomcat 7 filter, the security protection is implemented as multiple filters, and the application developer needs to follow the framework to enable the security filters in the application codes. No rules definition is enabled in the Tomcat 7 filter.

Second, evaluate the capability for the rules definition. Comparing to ModSecurity rules, a significant feature for WASP HRS is the ability to support the RESTFul URL pattern definition and the validation for the dynamic input values embedded in the RESTful URL. Meanwhile, HRS can support the URL-based rule inheritance by defining the inheritParent attribute to the URL path node.

Third, the virtual patching capability is implemented in WASP by using application context information and the AppScan tool. Then it is possible to further re-test the rules using the RDT testing tool. The RDT is implemented as the RESTful service, which provides the RESTful API for users to manage JSON-based rule files in the WASP store house.

Empirical Results

This section first compares the functionality for the Tomcat 7 filter, ModSecurity and WASP and then describes non-limiting exemplary experiences with WASP, focusing on performance evaluation and usability for user experience.

Figures 16, 17:
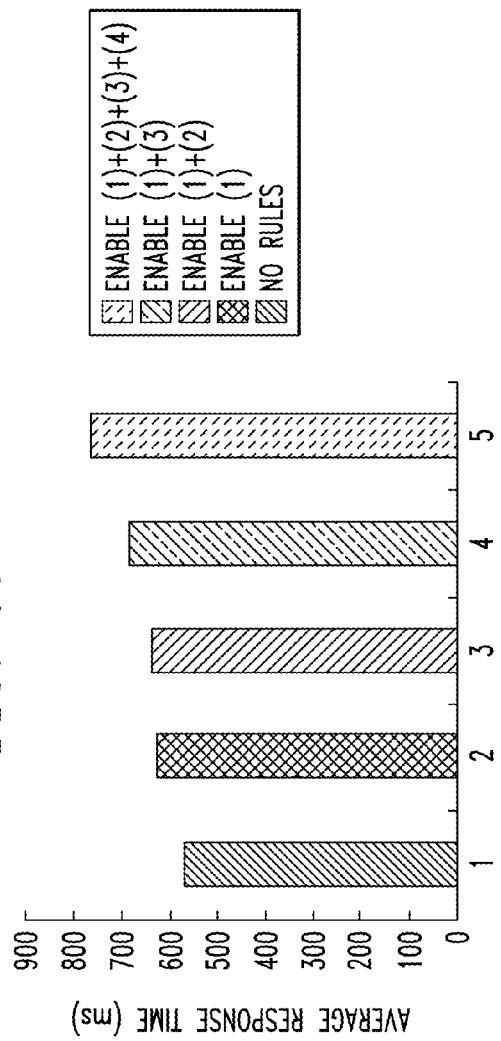
FIG. 16 is a table showing an experiment environment setting, according to an aspect of the invention.
FIG. 17 shows average response time versus enabling different modules, according to an aspect of the invention.

To evaluate the performance impact of WASP, experiments were conducted on 3-node machines connected via a high-speed LAN. As shown in the table of FIG. 16, one of the nodes is an Intel Core2 6700 2.66 GHz, 3G RAM machine with the Windows server 2003 operating system. Two of the nodes are Intel® Xeon™ 2 CPU 2.80 GHz, 4G RAM machines with SUSE LINUX Enterprise Server 9. The nodes are connected to the Internet through a 1000M bps connection. The node with the Windows system is deployed with LoadRunner (version 8.0) and mimics client browsers, simulating multiple users by sending concurrent HTTP requests to the server application. Two of the nodes with SUSE are used on the server side to process HTTP requests. WASP is deployed on one of the nodes in the WebSphere proxy server (version 7); and the other node is deployed with a WebSphere application server (version 7) and IBM DB2® server (version 9.0)(registered mark of IBM). No other tasks were running on each node.

Figure 18:
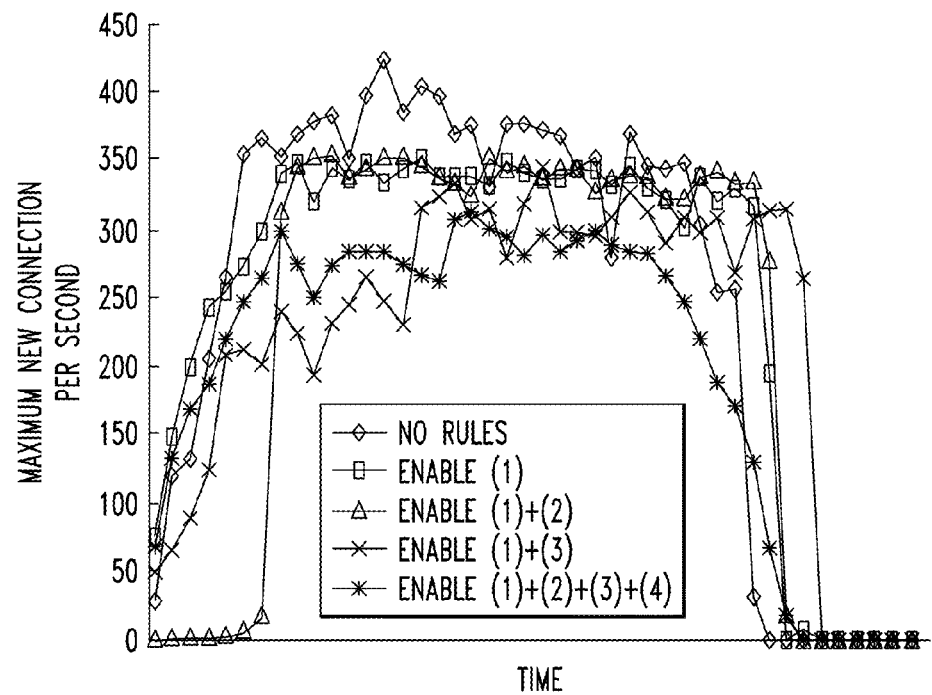
FIG. 18 shows maximum new connections versus enabling different modules, according to an aspect of the invention.
Figure 19:
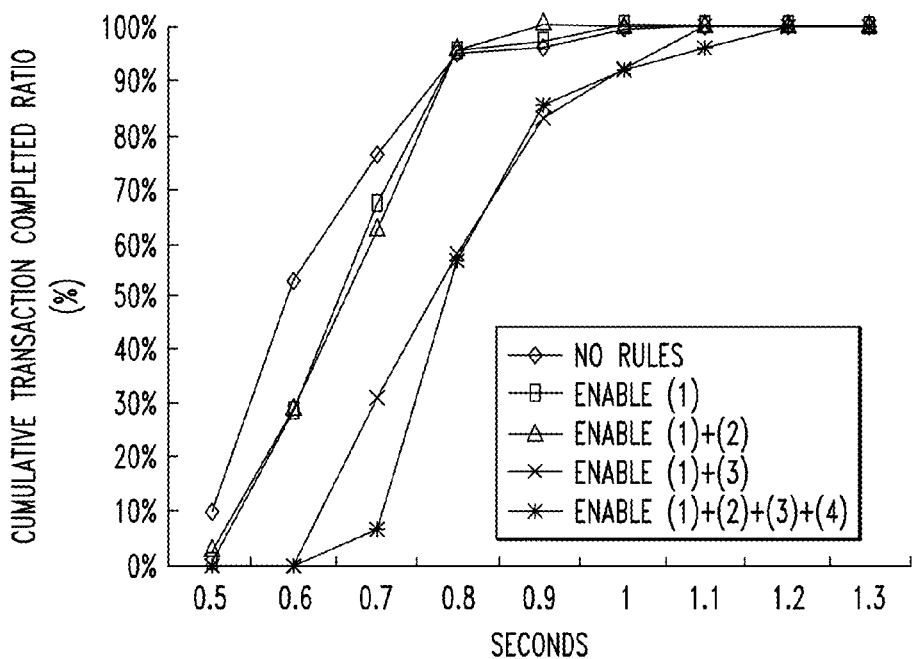
FIG. 19 shows the cumulative transaction completed ratio versus enabling different modules, according to an aspect of the invention.

FIG. 17 shows average response time versus enabling different modules; FIG. 18 shows maximum new connections versus enabling different modules; and FIG. 19 shows the cumulative transaction completed ratio versus enabling different modules.

Based on the performance metric for application firewalls, three metrics, namely, Maximum New Connections per Second, Maximum Throughput per Second, and Average Response Time, are used for the performance impact evaluation. According to the WASP architecture shown in FIG. 4, the design of the test cases is based on estimation of the potential major bottlenecks in the WASP runtime. Based on the analysis of the WASP runtime code structure, the following four points are identified to be potential performance root causes and are tested in detail.

Condition operator: The regex matching for the positive pattern and negative pattern are implemented in the condition operator, to validate the users' input values. The negative pattern with long regex pattern will cost more computation resources.

Codecs module: The encoded characters such as Hex, Base64, and the like also can be executed as active content in client browsers to launch XSS attacks. The user input value will be sanitized and decoded in case the encoded characters are detected in this module.

RESTful URL rewriting module: The RESTful URL in which the dynamic value is embedded will be rewritten to the static one based on the URL pattern, then follow the rule retrieving approach on the rewritten static one.

Response handler: To prevent CSRF attacks, some token(s) can be inserted to the response page to prevent the following forgery request based on the preissued token. This operation will increase some response latency.

The setting of the test cases is shown in the table of FIG. 13. FIG. 17 shows the average response time is 567 milliseconds without enabling rules in the WASP runtime engine, and the average response time will increase to 195 milliseconds after enabling all the modules in WASP, including the condition operator, codecs module, RESTful rewriting module, and response handler. Meanwhile the maximum new connections per second will decrease 22% percent with all the modules enabled in WASP as in FIG. 18. FIG. 19 plots the cumulative completed transaction ratio against time. Contrasting their performances, it can be seen that after 1000 ms, the success transaction completed ratio decreases from 100% for no rule enabled to 92% for all the modules enabled.

Recapitulation

Due consideration has been given to the firewall rule language defined in DataPower, ModSecurity, and the like, as well as the UML model defined in the WADL specification. One or more embodiments provide a WASP rule language HRS. One or more embodiments provide an HTTP message model defined in HRS, which supports URLTemplate, which can validate the dynamic input value embedded in dynamic URL, to support more REST message(s). HRS can express hierarchical fine-grain and semantically rich rules to prevent a broad class of attacks in HTTP request and response. Based on HRS, one or more embodiments implement the WASP rule management tool as a RESTful service to manage the JSON-based rule files. In addition, a rule transformation engine is implemented in the rule development tool, which can transform the WASP rules to IBM DataPower rules.

In one or more embodiments, four steps enable the virtual patching for firewall rules. Create the WASP rule template based on HRS and application context information. From application context information such as web.xml, struts.xml, or WADL file, retrieve the URLTemplate especially for the dynamic RESTful URL. For the rule generation, parse the XML report of a security testing tool, AppScan, to generate-WASP messages and rules, which will be processed by the runtime WASP engine.

One or more embodiments bridge the gap between the firewall and back-end applications. For example, in some current techniques, when a non-compliant character is detected in a server-side firewall, a static error page is thrown out to the end user, which breaks the consistency of application logic and induces a bad user experience. The mechanism of smart error reporting, according to one or more embodiments, is different from these works, and is enabled in a runtime firewall engine to protect on boarding applications. One or more embodiments are consistent with the existing application logics and no modification of application codes is required. Instead of throwing out a static error page to end users when some violation is detected in a runtime WASP engine, a friendly error message and input backfill mechanism is designed to improve the user experience.

One or more embodiments provide a WASP rule language and meta-model to handle most aspects of HTTP requests and responses, including the application context. The application context is often encoded in one or more configuration files and/or annotations that are part of the backend methods. One or more embodiments use the application context to develop fine-grained and semantically rich WASF rules. Meanwhile, a rule development tool is provided in one or more embodiments to illustrate how to develop security rules based on the WASP rule language.

Virtual patching is a process in which a security administrator will develop and deploy one or more rules on a Web Application Firewall (WASF) to prevent any exploitation of application vulnerability. One or more embodiments provide a mechanism for provisioning rules using application context and testing tool results for interactive virtual patching. An experimental prototype of has been developed in the context of a WASP project. Meanwhile, the smart error reporting mechanism in the context of WASP is provided by one or more embodiments. Rather than simply throwing out a static error page to end users when a violation is detected in the firewall, one or more embodiments provide usable security that provides friendly error messages with a backfill mechanism. The experimental evaluation shows that, in one or more embodiments, the user experience is improved by smart error reporting. Also, this mechanism is consistent with the existing application logic and no modification of application codes is required in at least some instances.

Figure 21:
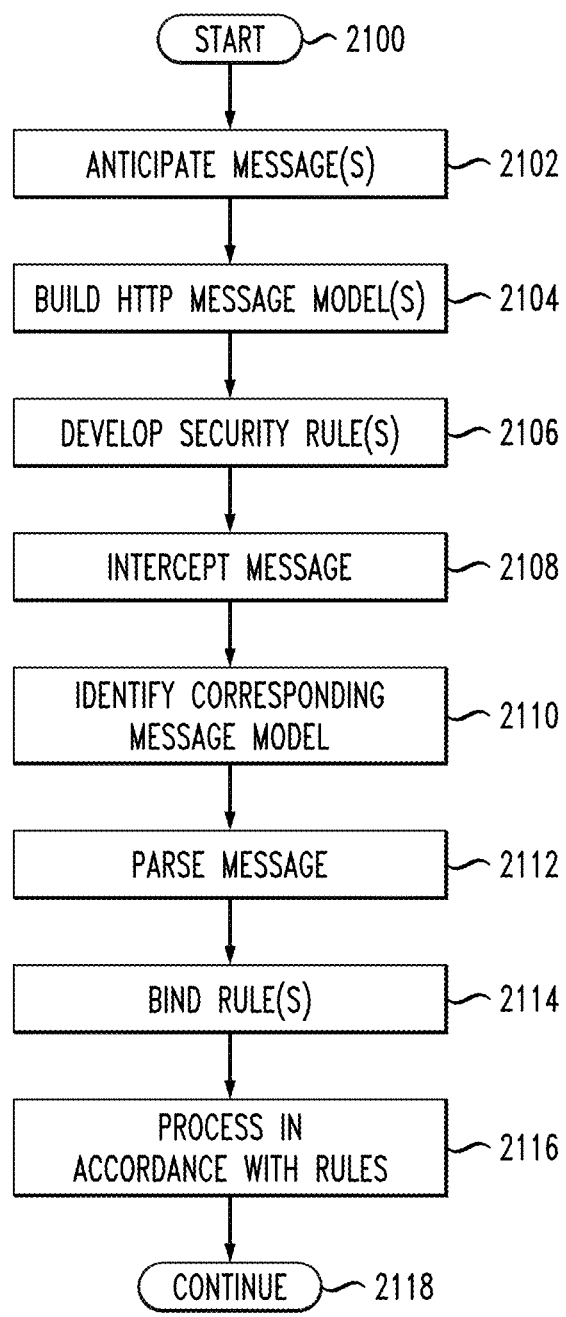
FIG. 21 shows a flow chart of an exemplary method, according to an aspect of the invention.

Reference should now be had to the flow chart of FIG. 21, which begins in step 2100. Given the discussion thus far, it will be appreciated that, in general terms, an exemplary method for operating a web application server firewall includes the step 2108 of intercepting at least one of an HTTP request message and an HTTP response message, as well as the step 2110 of identifying a corresponding HTTP message model, based on the intercepting step. The HTTP message model includes a plurality of message model sections. Further step 2112 includes parsing a representation of the HTTP request or response message into message sections in accordance with the message model sections of the HTTP message model. In the general case, the representation could be the actual message, but in a preferred approach, the representation is a copy of the message copied by the connector and forwarded to the message handler as described above.

Additional step 2114 includes binding a plurality of security rules to the message model sections. The plurality of security rules each specify at least one action to be taken in response to a given condition. The given condition is based, at least in part, on a corresponding given one of the message sections (i.e., the rule is applied by seeing if the corresponding sections in the actual message meet the condition specified for such sections in the rule itself). A further step 2116 includes processing the at least one of an HTTP request message and an HTTP response message in accordance with the plurality of security rules (typically, filtering "bad" messages and allowing "good" messages through).

Processing continues at 2118.

Optional additional steps in the operating method include step 2104, building the corresponding HTTP message model, and step 2106, developing the plurality of security rules.

In some instances, steps 2104 and/or 2106 further include causing at least one given one of the plurality of security rules which is written for a parent portion of the HTTP message model to be inherited for a child portion of the HTTP message model.

With regard to parameter inheritance, there are two inheritances format on URL:

1. the resource on the URL at 2016 can be regarded as a child of the resource on the URL at 2020; in this type, filepathnode in the URL is used to mark the resources and their sequences are marked as hierarchy.
2. the resource on URL at the second line of 2018 can be regarded as a child on the URL at the first line of 2018; in this format, parameter "type" with its value "qOpp" is used to describe child element for the base module on the given URL.

In some instances, steps 2104 and/or 2106 further include chaining at least two given ones of the plurality of security rules together based on at least the given condition being common to both of the at least two given ones of the plurality of security rules.

In some cases, step 2104 includes building the corresponding HTTP message model in UML.

In some cases, step 2116 further includes message content normalization.

As will be discussed further below, in some cases, the method further includes providing a system, wherein the system includes distinct software modules, each of the distinct software modules being embodied on a computer-readable storage medium. The modules can include, for example, a connector module 408, a message handler module 410, a rule development tool (RDT) module 424, and runtime engine module 412. In such cases, step 2108 is carried out by the connector module executing on at least one hardware processor, steps 2110 and 2112 are carried out by the message handler module executing on the at least one hardware processor, steps 2104, 2106, and 2114 are carried out by the rule development tool module executing on the at least one hardware processor, and step 2116 is carried out by the runtime engine module executing on the at least one hardware processor. At least one hardware processor includes, for example, all steps executing on a single processor, or, for example, steps 2104, 2106, and 2114 running on one processor and steps 2108, 2110, 2112, and 2116 running on another.

Continued reference should be had to the flow chart of FIG. 21. Given the discussion thus far, it will be appreciated that, in general terms, an exemplary method for developing rules for a web application server firewall includes the step 2102 of anticipating at least one of an HTTP request message and an HTTP response message likely to be processed by the web application server firewall (for example, by a human expert).

A further step 2104 includes building a corresponding HTTP message model, based on the anticipating step. The HTTP message model includes a plurality of message model sections. Another step 2106 includes developing a plurality of security rules each specifying at least one action to be taken in response to a given condition. As discussed above, the given condition is based, at least in part, on a corresponding section of an actual message. A further step 2114 includes binding the plurality of security rules to the message model sections.

In some cases, the anticipation of at least one of an HTTP request message and an HTTP response message could be carried out externally and step 2104 could be based on externally-supplied information about such anticipated message(s).

As noted above, processing continues at step 2118.

In some instances, steps 2104 and 2106 further include causing at least one given one of the plurality of security rules which is written for a parent portion of the HTTP message model to be inherited for a child portion of the HTTP message model.

In some instances, steps 2104 and 2106 further include chaining at least two given ones of the plurality of security rules together based on at least the given condition being common to both of the at least two given ones of the plurality of security rules.

In some cases, the building of the corresponding HTTP message model in step 2104 includes building in UML.

As will be discussed further below, in some cases, the method further includes providing a rule development tool system 424, wherein the rule development tool system includes distinct software modules, each of the distinct software modules being embodied on a computer-readable storage medium. The modules can include, for example, a message modeling module 450, a rule modeling module 452, and a message rule binding module 454. In such cases, step 2104 is carried out by the message modeling module executing on at least one hardware processor, step 2106 is carried out by the rule modeling module executing on the at least one hardware processor, and step 2114 is carried out by the message rule binding module executing on the at least one hardware processor.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for operating a web application server firewall, said method comprising the steps of:
    building a plurality of HTTP message models for anticipated messages including HTTP request messages and HTTP response messages, said plurality of HTTP message models including at least a first HTTP message model and a second HTTP message model corresponding to an HTTP request message and an HTTP response message, respectively, and each of said plurality of HTTP message models comprising a plurality of message model sections;
    intercepting at least one of said HTTP request message and said HTTP response message;
    identifying a corresponding HTTP message model from among said plurality of HTTP message models, based on said intercepting step, said HTTP message model comprising a plurality of message model sections;
    parsing a representation of said at least one of said HTTP request message and said HTTP response message into message sections in accordance with said message model sections of said HTTP message model;
    binding a plurality of security rules to said message model sections, said plurality of security rules each specifying at least one action to be taken in response to a given condition, said given condition being based, at least in part, on a corresponding given one of said message sections; and
    processing said at least one of said HTTP request message and said HTTP response message in accordance with said plurality of security rules.

2. The method of claim 1, wherein building said plurality of HTTP message models further comprises developing said plurality of security rules.

3. The method of claim 2, wherein said building and developing further comprise causing at least one given one of said plurality of security rules which is written for a parent portion of a corresponding HTTP message model to be inherited for a child portion of said corresponding HTTP message model.

4. The method of claim 2, wherein said building and developing further comprise chaining at least two given ones of said plurality of security rules together based on at least said given condition being common to both of said at least two given ones of said plurality of security rules.

5. The method of claim 2, wherein said building of said plurality of HTTP message models comprises building of said plurality of HTTP message models in UML.

6. The method of claim 2, wherein said processing further comprises message content normalization.

7. The method of claim 2, further comprising providing a system, wherein the system comprises distinct software modules, each of the distinct software modules being embodied on a computer-readable storage medium, and wherein the distinct software modules comprise a connector module, a message handler module, a rule development tool module, and runtime engine module;
    wherein:
    said intercepting is carried out by said connector module executing on at least one hardware processor;
    said identifying and said parsing are carried out by said message handler module executing on said at least one hardware processor;
    said binding, building, and developing are carried out by said rule development tool module executing on said at least one hardware processor; and
    said processing is carried out by said runtime engine module executing on said at least one hardware processor.

8. An article of manufacture comprising a computer program product for operating a web application server firewall, said computer program product comprising: a computer readable storage medium, storing in a non-transitory manner computer readable program code, the computer readable program code comprising:
    computer readable program code configured to build a plurality of HTTP message models for anticipated messages including HTTP request messages and HTTP response messages, said plurality of HTTP message models including at least a first HTTP message model and a second HTTP message model corresponding to an HTTP request message and an HTTP response message, respectively, and each of said plurality of HTTP message models comprising a plurality of message model sections;
    computer readable program code configured to intercept at least one of said HTTP request message and said HTTP response message;
    computer readable program code configured to identify a corresponding HTTP message model from among said plurality of HTTP message models, based on said intercepting step, said HTTP message model comprising a plurality of message model sections;
    computer readable program code configured to parse a representation of said at least one of said HTTP request message and said HTTP response message into message sections in accordance with said message model sections of said HTTP message model;
    computer readable program code configured to bind a plurality of security rules to said message model sections, said plurality of security rules each specifying at least one action to be taken in response to a given condition, said given condition being based, at least in part, on a corresponding given one of said message sections; and
    computer readable program code configured to process said at least one of said HTTP request message and said HTTP response message in accordance with said plurality of security rules.

9. The article of manufacture of claim 8, wherein said computer readable program code configured to build said plurality of HTTP message models further comprising computer readable program code configured to develop said plurality of security rules.

10. The article of manufacture of claim 9, wherein said computer readable program code configured to build and develop further comprises computer readable program code configured to cause at least one given one of said plurality of security rules which is written for a parent portion of a corresponding HTTP message model to be inherited for a child portion of said corresponding HTTP message model.

11. The article of manufacture of claim 9, wherein said computer readable program code configured to build and develop further comprise computer readable program code configured to chain at least two given ones of said plurality of security rules together based on at least said given condition being common to both of said at least two given ones of said plurality of security rules.

12. The article of manufacture of claim 9, wherein said computer readable program code configured to build said plurality of HTTP message models comprises computer readable program code configured to build said plurality of HTTP message models in UML.

13. The article of manufacture of claim 9, wherein said computer readable program code configured to process further comprises computer readable program code configured to carry out message content normalization.

* * * * *